(12) United States Patent
Kurimura et al.

(10) Patent No.: US 9,227,385 B2
(45) Date of Patent: Jan. 5, 2016

(54) METHOD FOR PROCESSING TRANSLUSCENT RIGID SUBSTRATE LAMINATE AND METHOD FOR MANUFACTURING PLATE SHAPED PRODUCT

(75) Inventors: Hiroyuki Kurimura, Shibukawa (JP); Hayato Miyazaki, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 141 days.

(21) Appl. No.: 13/885,929

(22) PCT Filed: Nov. 17, 2011

(86) PCT No.: PCT/JP2011/076580
§ 371 (c)(1),
(2), (4) Date: May 16, 2013

(87) PCT Pub. No.: WO2012/067205
PCT Pub. Date: May 24, 2012

(65) Prior Publication Data
US 2013/0233479 A1    Sep. 12, 2013

(30) Foreign Application Priority Data
Nov. 19, 2010 (JP) .................... 2010-259142

(51) Int. Cl.
*B32B 37/02* (2006.01)
*C03B 33/07* (2006.01)
(Continued)

(52) U.S. Cl.
CPC .............. *B32B 37/02* (2013.01); *C03B 33/076* (2013.01); *C09J 4/00* (2013.01); *C09J 5/00* (2013.01); *C09J 2205/31* (2013.01); *C09J 2433/00* (2013.01); *Y10T 156/11* (2015.01)

(58) Field of Classification Search
CPC ............. C03B 33/076; C09J 4/00; C09J 5/00; B32B 37/02
USPC ....................... 156/272.2, 248, 701
See application file for complete search history.

(56) References Cited

U.S. PATENT DOCUMENTS

| 5,641,140 A * | 6/1997 | Sorenson .................... 248/205.3 |
| 2010/0000670 A1* | 1/2010 | Kurimura et al. ............. 156/247 |

FOREIGN PATENT DOCUMENTS

| JP | 2007-39532 | 2/2007 |
| JP | 2007039532 A * | 2/2007 |

(Continued)

OTHER PUBLICATIONS

International Search Report for PCT/JP2011/076580; mailed Feb. 21, 2012.

(Continued)

*Primary Examiner* — Daniel McNally
(74) *Attorney, Agent, or Firm* — Stein IP, LLC (57) ABSTRACT

There is provided a method by which it is possible to precisely process a translucent rigid substrate laminate. The method for processing a translucent rigid substrate laminate includes the steps of: preparing a translucent rigid substrate laminate by adhering two or more translucent rigid substrates with photocurable adhering agent; fixing the laminate to a cradle with predetermined adhesive; performing processing A for cutting the laminate, which is fixed to the cradle, in a thickness direction and forming a desired number of divided translucent rigid substrate laminates, or performing desired outline processing B on the laminate which is fixed to the cradle; and peeling the processed translucent rigid substrate laminate from the cradle by applying external force without heating the translucent rigid substrate laminate at 40° C. or more.

17 Claims, 2 Drawing Sheets

(51) Int. Cl.
*C09J 4/00* (2006.01)
*C09J 5/00* (2006.01)

(56) References Cited

FOREIGN PATENT DOCUMENTS

| | | |
|---|---|---|
| JP | 2009-256125 | 11/2009 |
| JP | 2009256125 A * | 11/2009 |
| WO | WO 2008/018252 | 2/2008 |

OTHER PUBLICATIONS

International Preliminary Report on Patentability dated Jun. 20, 2013, issued in corresponding International Application No. PCT/JP2011/076580.

* cited by examiner

METHOD FOR PROCESSING TRANSLUSCENT RIGID SUBSTRATE LAMINATE AND METHOD FOR MANUFACTURING PLATE SHAPED PRODUCT

CROSS-REFERENCE TO RELATED APPLICATIONS

This application is a national stage application of PCT Application No. PCT/JP2011/076580, filed Nov. 17, 2011, which claims the benefit of Japanese Application No. 2010-259142, filed Nov. 19, 2010, in the Japanese Intellectual Property Office, the disclosures of which are incorporated herein by reference.

BACKGROUND OF THE INVENTION

1. Field of the Invention

The present invention relates to a method for processing a translucent rigid substrate laminate. In addition, the present invention relates to a method for manufacturing a plate shaped product such as protection glass of a display element.

2. Description of the Related Art

In display unit of various electronic devices such as a television, a notebook computer, a car navigation, an electronic calculator, a mobile phone, an electronic organizer, and a PDA (Personal Digital Assistant), displays such as a liquid crystal display (LCD), an organic EL display (OELD), an electroluminescence display (ELD), afield emission display (FED), and a plasma display (PDP) are used. In addition, a plate glass product for protection is generally placed to cover such a display in order to protect the display element.

The plate glass product is obtained by processing plate glass to have a size and shape which are suitable for each display unit, and it is necessary to process a large amount of plate glass products with high production efficiency in order to meet market requirements for a certain price level.

Thus, a method for enhancing the production efficiency of plate glass products has been proposed in Japanese Laid-Opened Patent Publication No. 2009-256125 (Patent Document 1). Specifically, "a method for processing plate glass including: forming a material gtass block (A) by laminating a plurality of material glass plates (1) and integrally adhering the respective material glass plates (1) by a releasable adhering material (2) which is interposed between the respective material glass plates (1); forming divided glass blocks (B) with a small area by dividing the material glass block (A) in a planer direction; forming glass block products (C) with a product shape in a planar view by processing at least an outer circumference of the divided glass blocks (B); and individually separating the glass block products (C) after processing an end surface of the glass block products (C)" has been proposed (Claim 1). Patent Literature 1 discloses that according to the above configuration "it is possible to obtain a plurality of plate glass products in the smaller number of processes and achieve high productivity since division, outline processing, and end surface processing are performed in a state where the plurality of material glass plates are laminated" (paragraph [0007]).

In addition, Patent Document 1 discloses that "the adhering material (2) interposed between the respective material glass plates (1) is a photocurable liquid-form adhering material, which cures when irradiated with an ultraviolet ray, the state of which is softened by increasing a temperature" (Claim 4). Patent Document 1 discloses that according to the configuration "the liquid-form adhering agent spreads to form a film with a uniform thickness over the entire surface between the upper and lower material glass plates when the photocurable adhering agent is interposed between the upper and lower material glass plates and pressure is applied thereon in the vertical direction, and if irradiation with an infrared ray is performed thereon in this state, the liquid-form adhering agent which has spread to form a film cures, and the upper and lower glass plates are integrally adhered. Therefore, it is possible to quickly, precisely, and integrally adhere the plurality of material glass plates by the laminating. In addition, if the product glass block is accommodated in hot water or the like, and the temperature is raised after final processing (end surface processing), the adhering agent which has cured between the respective glass plates is softened and separated into films. Therefore, collection and treatment of the adhering agent are facilitated without causing environmental contamination." (paragraph [0007]).

PRIOR ART DOCUMENTS

D1: Japanese Laid-Opened Patent Publication No. 2009-256125

SUMMARY OF THE INVENTION

In the method described in Patent Document 1, specifically, the process for "forming divided glass blocks (B) each having a small area by dividing the material glass block (A) in a planer direction after forming the material glass block (A)" (hereinafter, such a process for cutting a translucent rigid substrate laminate in the thickness direction and dividing the translucent rigid substrate laminate into a smaller translucent rigid substrate laminate will be referred to as "cutting processing") is a process for dividing the material glass block (A) placed on a cradle by a disc cutter according to the description in the paragraph 0012 in Patent Document 1, the material glass block (A) is not fixed to the cradle, and therefore, there is a concern that positional deviation of the material glass block (A) occurs during the processing, and high processing precision cannot always be achieved by the method. In addition, there is no description relating to fixing of a processed material in the process for "forming glass block products (C) each having a product shape in a planar view by processing at least an outer circumference of the divided glass blocks (B)" and a process for "processing an end surface of the glass block products (C)" (hereinafter, such outline processing of the translucent rigid substrate laminate will be referred to as "router processing") in the method described in Patent Document 1.

Thus, an object of the present invention is to provide a method by which it is possible to precisely process a translucent rigid substrate laminate such as a glass block as described in Patent Document 1. In addition, another object of the present invention is to provide a method for manufacturing a plate shaped product by using the processing method.

The present inventors consider that it is effective to perform cutting processing and router processing after fixing the translucent rigid substrate laminate to the cradle with adhesive as a result of intensive study for solving the above problems.

However, if the translucent rigid substrate laminate is fixed to the cradle with permanent adhesive, it is not easy to peel the laminate off from the cradle after completion of the processing, and there is a high risk that the laminate cracks during the peeling operation if an attempt to forcibly peel the laminate is made. In addition, there is a concern that operability is degraded, and for example, it is necessary to perform a cleaning operation since glue remains on the surface of the laminate or the cradle even if the laminate does not crack.

In addition, it is necessary to perform heating at the time of adhering and peeling when hot-melt adhesive is used, and there is a risk that the adhesive which temporarily bonds the respective substrates of the translucent rigid substrate laminate loses adhesive force at this time and inter-layer release occurs.

As a result of the study as described above, the present inventor found out that it is possible to maintain a fixed state to the cradle during the cutting processing and the router processing and peel the translucent rigid substrate laminate which is adhered to the cradle while reducing the risk that the laminate cracked or inter-layer cleavage occurred after the cutting processing and the router processing if adhesive with a predetermined constituent composition is used. Therefore, it is possible to precisely process the laminate while the laminate is fixed to the cradle.

According to an aspect of the present invention which is completed on the basis of the above knowledge, there is provided a method for processing a translucent rigid substrate laminate including the steps of:

preparing a translucent rigid substrate laminate by adhering two or more translucent rigid substrates with photocurable adhering agent;

fixing the laminate to a cradle with adhesive X, adhesive Y, or combination thereof;

<adhesive X> a curable composition, which contains (A') polyfunctional (meth)acrylate, (B') monofunctional(meth)acrylate, (C') organic peroxide, and (D') decomposition accelerator of the organic peroxide <adhesive Y> an adhesive composition, which contains (A) polyfunctional(meth)acrylate, (B) monofunctional(meth)acrylate, and (C) photopolymerization initiator performing processing A for cutting the laminate, which is fixed to the cradle, in a thickness direction and forming a desired number of divided translucent rigid substrate laminates, or performing desired outline processing B on the laminate which is fixed to the cradle; and peeling the processed translucent rigid substrate laminate from the cradle by applying external force without heating the translucent rigid substrate laminate at 40° C. or more.

According to an embodiment of a method for processing a translucent rigid substrate laminate of the present invention, there is provided a method for processing a translucent rigid substrate laminate including the steps of:

preparing a translucent rigid substrate laminate by adhering two or more translucent rigid substrates with photocurable adhering agent;

fixing the laminate to a cradle with adhesive X, adhesive Y, or combination thereof described below;

<adhesive X> an adhesive composition, which contains (A') polyfunctional(meth)acrylate, (B') monofunctional(meth)acrylate, (C') organic peroxide, and (D') decomposition accelerator of the organic peroxide, in which total mass of the constituents (A'), (B'), (C'), and (D') occupies 90% by mass or more of the composition <adhesive Y> an adhesive composition, which contains (A) polyfunctional(meth)acrylate, (B) monofunctional(meth)acrylate, and (C) photopolymerization initiator, in which total mass of the constituents (A), (B), and (C) occupies 90% by mass or more of the composition performing processing A for dividing the laminate, which is fixed to the cradle, in a thickness direction and forming a desired number of divided translucent rigid substrate laminates;

peeling the divided translucent rigid substrate laminates from the cradle by applying external force without heating the translucent rigid substrate laminates at 40° C. or more;

fixing the respective peeled translucent rigid substrate laminates to the cradle with the adhesive X, the adhesive Y, or the combination thereof;

performing desired outline processing B on the laminates fixed to the cradle; and peeling the translucent rigid substrate laminates, which has been subjected to the outline processing, from the cradle by applying external force without heating the translucent rigid substrate laminate at 40° C. or more.

According to an embodiment of the method for processing a translucent rigid substrate laminate of the present invention, when the processing A is performed, the adhesive X, the adhesive Y, or the combination thereof is applied to the cradle and/or bonding planes of the translucent rigid substrate laminates in an application pattern in which the respective divided laminates are able to maintain a fixed state to the cradle even after the processing.

According to an embodiment of the method for processing a translucent rigid substrate laminate of the present invention, when the processing B is performed, the adhesive X and the adhesive Y are applied to the cradle and/or the bonding planes of the laminates in an application pattern in which the adhesive Y surrounds the adhesive X.

According to an embodiment of a method for processing a translucent rigid substrate laminate of the present invention, the adhesive X, the adhesive Y, or the combination thereof is mixture of the adhesive X and the adhesive Y.

According to an embodiment of a method for processing a translucent rigid substrate laminate of the present invention, at least the adhesive X is used, and the adhesive X does not contain polar organic solvent.

According to an embodiment of a method for processing a translucent rigid substrate laminate of the present invention, the step of peeling the processed translucent rigid substrate laminate, which has been divided or subjected to the outline processing, from the cradle by applying external force without heating the translucent rigid substrate laminate at 40° C. or more is a step of peeling the translucent rigid substrate laminate by inserting a jig into an adhesive layer between the cradle and the translucent rigid substrate laminate and using the principle of leverage.

According to still another embodiment of the method for processing a translucent rigid substrate laminate of the present invention, the translucent rigid substrate is plate glass.

According to another aspect of the present invention, there is provided a method for manufacturing a plate shaped product including the steps of: peeling translucent rigid substrates, which are attached to each other, by heating a translucent rigid substrate laminate which has been subjected to the method for processing a translucent rigid substrate laminate according to the present invention and forming a plurality of plate shaped products.

According to the present invention, it is possible to precisely process a translucent rigid substrate laminate and industrially produce plate shaped product with enhanced dimensional precision. The present invention can be preferably used in mass production of protection glass for displays, for example.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a detailed description will be given of embodiments of the present invention with reference to the drawings. In this specification, the adhesive collectively means photocurable adhering agent and adhesive compositions which are curable at an ordinary temperature in some cases.

<I. Preparation of Translucent Rigid Substrate Laminate>

Figure 1:
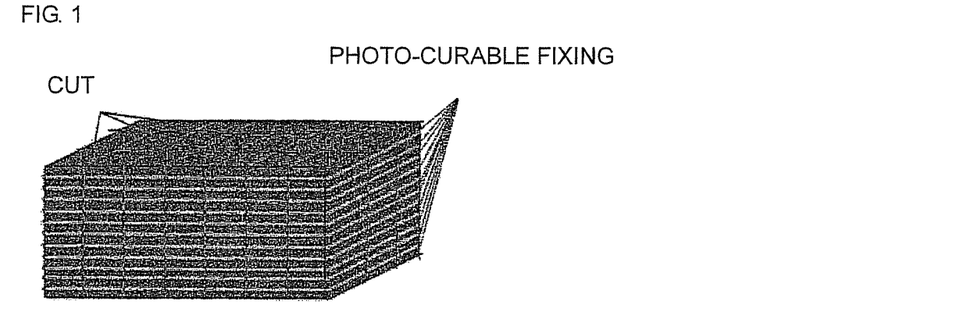
FIG. 1 is a diagram schematically showing an example of a translucent rigid substrate laminate before performing cutting processing or outline processing.

FIG. 1 is a diagram schematically showing an example of a translucent rigid substrate before performing cutting processing and outline processing. Although translucent rigid substrates which constitute the translucent rigid substrate laminate are not particularly limited, examples thereof include plate glass (reinforced plate glass, material glass plate, a glass substrate with a transparent conductive film, a glass substrate on which an electrode and a circuit are formed, and the like), a sapphire substrate, a quartz substrate, a plastic substrate, and a magnesium fluoride substrate. Although the size of a translucent rigid substrate is not particularly limited, a translucent rigid substrate typically has an area of about 10000 $mm^2$ to 250000 $mm^2$ and a thickness of about 0.1 mm to 2 mm. Translucent rigid substrates with the same size are generally laminated. In a translucent rigid substrate laminate, two or more translucent rigid substrates are laminated. Since mechanical strength is degraded if the entire thickness of the translucent rigid substrate laminate is excessively thin, and the translucent rigid substrate laminate easily cracks when the translucent rigid substrate which is fixed to the cradle with adhesive for the processing is peeled off, preferably five or more (total thickness of the substrates is equal to or more than 0.5 mm) of, and more preferably about 10 to 30 (total thickness of the substrates is about 1 mm to 60 mm) of translucent rigid substrates are laminated via photocurable adhering agent although the number thereof also depends on a material of the translucent rigid substrates.

It is possible to apply a predetermined print pattern and a plating pattern for implementing a function of a plate shaped product to the surface of each translucent rigid substrate although not exclusive. Examples of the print pattern include design for a display screen of a mobile phone, and examples of the plating pattern include a rotary encoder to which a metal wiring pattern of Al, AlNd, or the like and a chromium plating pattern are applied.

The photocurable adhering agent has a characteristic that the photocurable adhering agent cures when irradiated with light such as an ultraviolet ray and softens when heated at a high temperature. Although the ultraviolet ray is typically used as the irradiation light, the irradiation light is not limited thereto and may be appropriately changed in accordance with a characteristic of a used adhering agent. For example, it is possible to perform irradiation with a microwave, an infrared ray, visible light, an ultraviolet ray, an X ray, γ ray, an electron beam, or the like. As described above, light means not only visible light but also an electromagnetic wave (an energy line) which include a wide wavelength domain in the present invention.

It is possible to laminate the translucent rigid substrates by attaching the respective translucent rigid substrates, to one of or both the attaching surfaces of which the photocurable adhering agent has been applied, and then irradiating the translucent rigid substrates with light in order to harden the adhering agent which has been spread between the translucent rigid substrates. By repeating the operation a desired number of times, it is possible to produce a translucent rigid substrate laminate in which a desired number of translucent rigid substrates are laminated. The light irradiation may be performed every time a translucent rigid substrate is laminated, or may be performed after a plurality of translucent rigid substrates are laminated as long as the light can reach the adhering agent.

Although arbitrary known photocurable adhering agent can be used, and the photocurable adhering agent is not particularly limited, preferable examples include an adhesive composition which contains (A) polyfunctional(meth)acrylate, (B) monofunctional(meth)acrylate, and (C) a photopolymerization initiator, as disclosed in WO 2008/018252.

(A) polyfunctional(meth)acrylate includes polyfunctional (meth)acrylate oligomer/polymer which has two or more (meth)acryloyl oligomer/polymer terminals or side chains or polyfunctional(meth)acrylate monomer which has two or more (meth)acryloyl groups. Examples of polyfunctional (meth)acrylate oligomer/polymer include 1,2-polybutadiene-terminated urethane(meth)acrylate ("TE-2000" or "TEA-1000" available from Nippon Soda Co., Ltd., for example), hydrogen additive thereof ("TEAI-1000" available from Nippon Soda Co., Ltd., for example), 1,4-polybutadiene-terminated urethane(meth)acrylate ("BAC-45" available from Osaka Organic Chemical Industry Ltd.), polyisoprene-terminated(meth)acrylate or polyester type urethane(meth) acrylate ("UV-2000B", "UV-3000B", or "UV-7000B" available from Nippon Synthetic Chemical Industry Co., Ltd., or "KHP-11" or "KHP-17" available from Negami Chemical Industry Co., Ltd., for example), polyether type urethane (meth)acrylate ("UV-3700B" or "UV-6100B" available from Nippon Synthetic Chemical Industry Co., Ltd., for example), and bisphenol A type epoxy(meth)acrylate.

Among them, polyester type urethane(meth)acrylate and/or polyether type urethane(meth)acrylate is preferable, and polyester type urethane(meth)acrylate is more preferable in terms of high effectiveness.

Here, urethane(meth)acrylate means urethane(meth)acrylate which can be obtained by causing a polyol compound (hereinafter, referred to as X), an organic polyisocyanate compound (hereinafter, referred to as Y), and hydroxyl(meth)acrylate (hereinafter, referred to as Z) to react.

Examples of the polyol compound (X) include multiple alcohol such as ethylene glycol, diethylene glycol, triethylene glycol, tetraethylene glycol, polyethylene glycol, propylene glycol, dipropylene glycol, polypropylene glycol, butylene glycol, 1,4-butanediol, polybutylene glycol, 1,5-pentanediol, 1,6-hexanediol, 1,8-octanediol, 1,9-nonanediol, 3-methyl-1,5-pentanediol, 2,4-diethyl-1,5-pentanediol, 2,2-butylethyl-1,3-propanediol, neopentyl glycol, cyclohexanedimethanol, hydrogenated bisphenol A, polycaprolactone, trimethylolethane, trimethylolpropane, polytrimethylolpropane, pentaerythritol, polypentaerythritol, sorbitol, mannitol, glycerin, polyglycerin, and poly tetramethylene glycol, polyether polyol which has at least one kind of structure of polyethylene oxide, polypropylene oxide, or block or random copolymer of ethylene oxide/propylene oxide, polyester polyol which is a condensation product of above multiple alcohol or polyether polyol and polybasic acid such as maleic acid anhydride, maleic acid, fumaric acid, itaconic acid anhydride, itaconic acid, adipic acid, or isophthalic acid, caprolactone modified polyol such as caprolactone modified poly tetramethylene polyol, polyolefin type polyol, polycarbonate type polyol, polydiene type polyol such as polybutadiene polyol, polyisoprene polyol, hydrogenated polybutadiene polyol, or hydrogenated polyisoprene polyol, or silicone polyol such as polydimethylsiloxane polyol. Among them, polyether polyol and/or polyester polyol is more preferable.

It is not particularly necessary to limit the organic polyisocyanate compound (Y), and it is possible to use polyisocyanate of an aromatic type, an aliphatic type, a cyclic aliphatic type, an alicyclic type, or the like, and particularly, polyisocyanate such as tolylene diisocyanate (TDI), diphenylmethane diisocyanate (MDI), hydrogenated diphenylmethane diisocyanate (H-MDI), polyphenyl methane polyisocyanate (crude MDI), modified diphenylmethane diisocyanate (modified MDI), hydrogenated xylylene diisocyanate (H-XDI), xylylene diisocyanate (XDI), hexamethylene diisocyanate (HMDI), trimethylhexamethylene diisocyanate (TMXDI), tetramethylxylylene diisocyanate (m-TMXDI), isophorone diisocyanate (IPDI), norbornene diisocyanate (NBDI), or 1,3-bis(isocyanatomethyl)cyclohexane (H6XDI), or a trimeric compound of such polyisocyanate, or a reaction product of such polyisocyanate and polyol is preferably used. Among them, hydrogenated xylylene diisocianate (H-XDI) and/or isophorone diisocyanate (IPDI) is preferable.

Hydroxyl(meth)acrylate (Z) includes 2-hydroxyethyl(meth)acrylate, 2-hydroxypropyl(meth)acrylate, 2-hydroxybutyl(meth)acrylate, 2-hydroxyethyl acryloyl phosphate, 4-butylhydroxy(meth)acrylate, 2-(meth)acryloyloxyethyl-2-hydroxypropyl phthalate, glycerin di(meth)acrylate, 2-hydroxy-3-acryloyloxypropyl(meth)acrylate, caprolactone modified 2-hydroxyethyl(meth)acrylate, pentaerythritol tri(meth)acrylate, dipentaerythritol penta(meth)acrylate, and caprolactone modified 2-hydroxyethyl(meth)acrylate. Among them, one or more kinds among a group consisting of 2-hydroxyethyl(meth)acrylate, 2-hydroxypropyl(meth)acrylate, and 2-hydroxybutyl(meth)acrylate are preferable.

The weight average molecular weight of polyfunctional (meth)acrylate oligomer/polymer is preferably from 7000 to 60000, and more preferably from 13000 to 40000. In examples, the weight average molecular weight was measured by using tetrahydrofuran as solvent, using a GPC system (SC-8010 manufactured by Tosoh Corporation), and creating a calibration curve with commercially available standard polystyrene under the following conditions.
Flow rate: 1.0 ml/min
Preset temperature: 40° C.
Column configuration: one of "TSK guardcolumn MP (xL)" 6.0 mmID×4.0 cm manufactured by Tosoh Corporation and two of "TSK-GEL MULTIPOREHXL-M" 7.8 mmID×30.0 cm (number of theoretical stages: 16,000 stages) manufactured by Tosoh Corporation, total of three columns (total number of theoretical stages: 32,000 stages)
Sample injection amount: 100 μl (concentration of sample solution: 1 mg/ml)
Solution sending pressure: 39 kg/cm$^2$
Detector: RI detector Bifunctional(meth)acrylate monomer includes 1,3-butylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dicyclopentanyl di(meth)acrylate, 2-ethyl-2-butyl-propanediol di(meth)acrylate, neopentyl glycol modified trimethylolpropane di(meth)acrylate, stearic acid modified pentaerythritol di(meth)acrylate, polypropylene glycol di(meth)acrylate, 2,2-bis(4-(meth)acryloxy diethoxyphenyl)propane, 2,2-bis(4-(meth)acryloxy propoxyphenyl)propane, and 2,2-bis(4-(meth)acryloxy tetraethoxyphenyl)propane. Among them, 1,6-hexanediol di(meth)acrylate and/or dicyclopentanyl di(meth)acrylate is preferable, and dicyclopentanyl di(meth)acrylate is more preferable in view of high effectiveness.

Trifunctional(meth)acrylate monomer includes trimethylolpropane tri(meth)acrylate, tris[(meth)acryloxyethyl]isocyanurate, and the like. Among them, trimethylolpropane tri(meth)acrylate is more preferable in view of high effectiveness.

Tetrafunctional or more functional(meth)acrylate monomers includes dimethylolpropane tetra(meth)acrylate, pentaerythritol tetra(meth)acrylate, pentaerythritolethoxy tetra(meth)acrylate, dipentaerythritol penta(meth)acrylate, and dipentaerythritol hexa(meth)acrylate.

Among polyfunctional(meth)acrylate, it is preferably to contain polyfunctional(meth)acrylate oligomer/polymer and/or bifunctional(meth)acrylate monomer in view of high effectiveness, and it is more preferable to use both polyfunctional(meth)acrylate oligomer/polymer and bifunctional(meth)acrylate monomer.

As for the content ratio when both polyfunctional(meth)acrylate oligomer/polymer and bifunctional(meth)acrylate monomer are used, the mass ratio of polyfunctional(meth)acrylate oligomer/polymer:bifunctional(meth)acrylate monomer in total of 100 parts by mass of polyfunctional (meth)acrylate oligomer/polymer and bifunctional(meth)acrylate monomer preferably satisfies 10 to 90:90 to 10, more preferably satisfies 25 to 75:75 to 25, and most preferably satisfies 40 to 65:60 to 35.

(A) polyfunctional(meth)acrylate is preferably hydrophobic. Hydrophobic polyfunctional(meth)acrylate means (meth)acrylate which does not have a hydroxyl group. When (A) polyfunctional(meth)acrylate is water-soluble, there is a concern that swelling of a cured body of the composition causes positional deviation during cutting processing and processing precision deteriorates, which is undesirable. However, hydrophilic (A) polyfunctional(meth)acrylate may be used as long as the cured body of the composition does not significantly swell due to water or is not partially dissolved.

(B) monofunctional(meth)acrylate monomer includes methyl(meth)acrylate, ethyl(meth)acrylate, propyl(meth)acrylate, butyl(meth)acrylate, 2-ethylhexyl(meth)acrylate, isooctyl(meth)acrylate, isodecyl(meth)acrylate, lauryl(meth)acrylate, stearyl(meth)acrylate, phenyl(meth)acrylate, cyclohexyl(meth)acrylate, dicyclopentanyl(meth)acrylate, dicyclopentenyl(meth)acrylate, dicyclopentenyloxy ethyl(meth)acrylate, isobornyl(meth)acrylate, methoxylated cyclodecatriene(meth)acrylate, 2-hydroxyethyl(meth)acrylate, 2-hydroxypropyl(meth)acrylate, 3-hydroxypropyl(meth)acrylate, 4-hydroxybutyl(meth)acrylate, terahydrofurfuryl(meth)acrylate, 2-hydroxy-3-phenoxypropyl(meth)acrylate, glycidyl(meth)acrylate, caprolactone modified terahydrofurfuryl(meth)acrylate, 3-chloro-2-hydroxypropyl(meth)acrylate, N,N-dimethylaminoethyl(meth)acrylate, N,N-diethylaminoethyl(meth)acrylate, t-butylaminoethyl(meth)acrylate, ethoxycarbonylmethyl(meth)acrylate, phenolethylene oxide modified (meth)acrylate, phenol (2-mol ethylene oxide modified) (meth)acrylate, phenol (4-mol ethylene oxide modified) (meth)acrylate, para-cumylphenolethylene oxide modified (meth)acrylate, nonylphenol ethylene oxide modified (meth)acrylate, nonylphenol (4-mol ethylene oxide modified) (meth)acrylate, nonylphenol (8-mol ethylene oxide modified) (meth)acrylate, nonylphenol (2.5-mol propylene oxide modified) (meth)acrylate, 2-ethylhexylcarbitol(meth)acrylate, ethylene oxide modified phthalic acid (meth)acrylate, ethylene oxide modified succinic acid(meth)acrylate, trifluoroethyl(meth)acrylate, acrylic acid, methacrylic acid, maleic acid, fumaric acid, ω-carboxy-polycaprolactone mono(meth)acrylate, phthalic acid monohydroxyethyl(meth)acrylate, (meth)acrylic acid dimer, β-(meth)acryloyloxyethyl hydrogen succinate, n-(meth)acryloyloxyalkyl hexahydro phthalimide, 2-(1,2-cyclohexacarboxylmide)ethyl(meth)acrylate, ethoxy diethylene glycol (meth)acrylate, and benzyl(meth)acrylate.

Among monofunctional(meth)acrylate, one or more kinds from a group consisting of 2-mol phenolethylene oxide modified (meth)acrylate, 2-(1,2-cyclohexacarboxylmide)ethyl(meth)acrylate, and 2-hydroxy-3-phenoxypropyl(meth)acrylate are preferable in terms of high effectiveness. It is more preferable to use all of 2-mol phenolethylene oxide modified (meth)acrylate, and 2-(1,2-cyclohexacarboxylmide)ethyl (meth)acrylate and/or 2-hydroxy-3-phenoxypropyl(meth)acrylate.

As for the content ratio when all of 2-mol phenolethylene oxide modified (meth)acrylate, and 2-(1,2-cyclohexacarboxylmide)ethyl(meth)acrylate and/or 2-hydroxy-3-phenoxypropyl(meth)acrylate are used in total of 100 parts by mass of 2-mol phenolethylene oxide modified (meth)acrylate, 2-(1,2-cyclohexacarboxylmide)ethyl(meth)acrylate, and 2-hydroxy-3-phenoxypropyl(meth)acrylate, a mass ratio of 2-mol phenolethylene oxide modified (meth)acrylate:2-(1,2-cyclohexacarboxylmide)ethyl(meth)acrylate and/or 2-hydroxy-3-phenoxypropyl(meth)acrylate preferably satisfies 5 to 80:95 to 20, more preferably satisfies 15 to 60:85 to 40, and most preferably satisfies 20 to 40:80 to 60.

As for the blending ratio of (A) polyfunctional(meth)acrylate and (B) monofunctional(meth)acrylate, (A):(B) preferably satisfies 5:95 to 95:5 (parts by mass). There is no concern that an initial adhesive property deteriorates if the content of (A) polyfunctional(meth)acrylate is equal to or more than 5 parts by mass, and it is possible to secure a peeling property if the content is equal to or less than 95 parts by mass. The content of (B) monofunctional(meth)acrylate is more preferably from 40 parts by mass to 80 parts by mass in the total amount of 100 parts by mass of (A) and (B).

Similarly, (B) monofunctional(meth)acrylate is preferably hydrophobic. Hydrophobic monofunctional(meth)acrylate means (meth)acrylate which does not have a hydroxyl group. When (B) polyfunctional(meth)acrylate is water-soluble, there is a concern that swelling of a cured body of the composition causes positional deviation during cutting processing and processing precision deteriorates, which is undesirable. However, hydrophilic (B) monofunctional(meth)acrylate may be used as long as the cured body of the composition does not significantly swell due to water or is not partially dissolved.

(C) photopolymerization initiator is blended in order to increase sensitivity by sensitizing by an activated light ray such as a visible light ray or an ultraviolet ray and promote light curing of the resin composition, and it is possible to use various kinds of known photopolymerization initiator. Specifically, it is possible to exemplify benzophenone or a derivative thereof; benzil or a derivative thereof; anthraquinone or a derivative thereof; benzoin; benzoin derivatives such as benzoin methyl ether, benzoin ethyl ether, benzoin propyl ether, benzoin isobutyl ether, and benzyl dimethyl ketal; acetophenone derivatives such as diethoxyacetophenone, and 4-t-butyl trichloroacetophenone; 2-dimethylamino ethyl benzoate; p-dimethylamino ethyl benzoate; diphenyl disulfide; thioxanthone or a derivative thereof; camphorquinone; camphorquinone derivatives such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethyl ester, 7,7-dimethyl-2,3-dioxobicyclo[2.2.1]heptane-1-carboxy-2-methyl ester, 7,7-dimethyl-2,3-dioxobicyclo[2.2.1]heptane-1-carboxylic acid chloride; α-aminoalkyl phenone derivatives such as 2-methyl-1-[4-(methylthio)phenyl]-2-morpholinopropane-1-one, and 2-benzyl-2-dimethylamino-1-(4-morpholinophenyl)-butanone-1; acyl phosphine oxide derivatives such as benzoyl diphenylphosphine oxide, 2,4,6-trimethylbenzoyl diphenylphosphine oxide, benzoyl diethoxyphosphine oxide, 2,4,6-trimethylbenzoyl dimethoxyphenylphosphine oxide, and 2,4,6-trimethylbenzoyl diethoxyphenylphosphine oxide, oxy-phenyl-acetic acid 2-[2-oxo-2-phenyl-acetoxy-ethoxy]-ethyl ester and/or oxy-phenyl-acetic acid 2-[2-hydroxy-ethoxy]-ethyl ester. One kind or two or more kinds of photopolymerization initiator can be used in combination. Among them, one kind or two or more kinds from a group consisting of benzyl dimethyl ketal, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester are preferable in view of high effectiveness.

The content of (C) photopolymerization initiator is preferably from 0.1 parts by mass to 20 parts by mass, and more preferably from 0.5 parts by mass to 10 parts by mass with respect to the total of 100 parts by mass of (A) and (B). It is possible to reliably achieve the effect of promoting curing if the content is equal to or more than 0.1 parts by mass, and a sufficient curing speed can be achieved if the content is equal to or less than 20 parts by mass. It is more preferable to add 1 part by mass or more of the constituent (C) since it is possible to implement curing regardless of the light irradiation amount, a degree of cross-linking of the cured body of the composition further increases, so that positional deviation and the like do not occur during the machining processing, and the peeling property is enhanced.

The total mass of the constituents (A), (B), and (C) is preferably equal to or more than 90% by mass of the adhesive composition from a viewpoint of the peeling property, and the total mass can typically be equal to or more than 95% by mass, and also be equal to or more than 98% by mass.

The photocurable adhering agent preferably contains a particulate matter (D) which is not dissolved in any of the constituents (A), (B), or (C) of the adhering agent. In doing so, it is possible to allow the composition to maintain a predetermined thickness after the curing and to thereby enhance the processing precision. Furthermore, since the cured body of the adhesive composition and the particulate matter (D) have different linear expansion coefficients, the peeling property is enhanced when the translucent rigid substrates are peeled off after they are attached by using the adhesive composition.

As a material of the particulate matter (D), any of generally used organic particles and inorganic particles may be used. Specifically, examples of the organic particles include polyethylene particles, polypropylene particles, cross-linked polymethylmethacrylate particles, and cross-linked polystyrene particles. Examples of the inorganic particles include ceramic particles of glass, silica, alumina, titanium, and the like.

The average particle size (D50) of the particulate matter (D) is preferably within a range from 20 µm to 200 µm. An excellent peeling property is achieved if the average particle size of the particulate matter is equal to or more than 20 µm, and deviation of the members which have been temporarily fixed is not easily generated and excellent dimensional precision can be achieved if the average particle size is equal to or less than 200 µm. The average particle size (D50) is more preferably from 35 µm to 150 µm, and further more preferably from 50 µm to 120 µm from a viewpoint of the peeling property and the dimensional precision. The average particle size (D50) is measured by a laser diffraction type particle size distribution measurement apparatus.

The usage amount of the particulate matter (D) is preferably from 0.01 parts by mass to 20 parts by mass, more preferably from 0.05 parts by mass to 10 parts by mass, and most preferably from 0.1 parts by mass to 6 parts by mass with respect to the total of 100 parts by mass of (A) and (B) from the viewpoint of the adhesive property, the processing precision, and the peeling property.

The particulate matter (D) preferably has a spherical shape from the viewpoint of enhancement of processing precision, namely control of the film thickness of the adhesive. Specific examples of the organic particles include cross-linked polymethylmethacryate particles and cross-linked polystyrene particles, each of which is obtained as monodisperse particles by an emulsion polymerization method of methylmethacrylate monomer or styrene monomer, respectively, and cross-linkable monomer, and examples of the inorganic particles include spherical silica. These examples are preferable since the particles are less deformed and the film thickness of the composition after the curing due to the variations of the particle size becomes uniform, and particularly, the cross-linked polymethylmethacrylate particles and the cross-linked polystyrene particles are further more preferable from viewpoints of storing stability such as settling of the particles and reactivity of the composition.

<II. Fixation of Translucent Rigid Substrate Laminate to Cradle>

After the translucent rigid substrate laminate is prepared, the laminate is fixed to the cradle with the adhesive X, the adhesive Y, or the combination thereof. The adhesive may be applied to the surface of the cradle, the surface of the laminate, or both the surfaces thereof. Fixing the translucent rigid substrate laminate to the cradle, it is possible to precisely perform various kinds of processing such as cutting processing and router processing on the laminate.

Here, when the cutting processing is performed, it is preferable to apply the adhesive to the surface of the cradle and/or the laminate in an application pattern in which the respective divided translucent rigid substrate laminates can be maintained in a fixed state to the cradle even after the processing. In doing so, it is possible to prevent oscillation or positional deviation of the divided translucent rigid substrate laminate during the cutting processing and occurrence of chipping and to thereby enhance processing precision.

Figure 2:
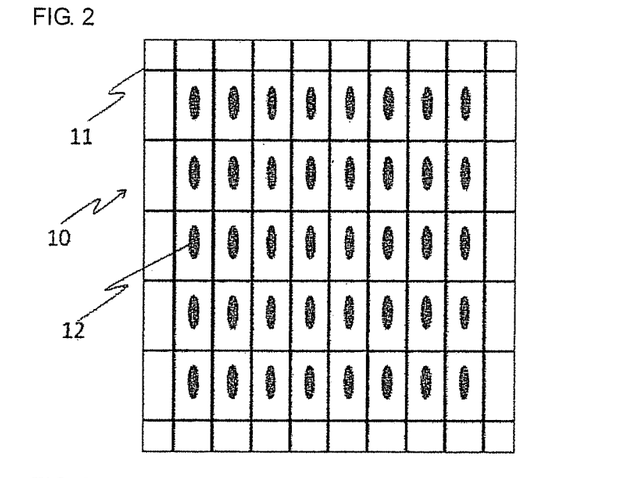
FIG. 2 is a diagram schematically showing an example of an application pattern of adhesive to a cradle.

The adhesive may be present over a boundary (a path of cutting means such as a disk cutter) which sections the divided translucent rigid substrate laminates or may be applied over the entire bonding plane of the translucent rigid substrate laminates. However, as shown in FIG. 2, for example, it is preferable to separately apply adhesive 12 to the vicinities of the respective centers of scheduled locations on the cradle, where the translucent rigid substrate laminates after the divisions are to be arranged. In such a case, there is an advantage that it is possible to prevent the adhesive from clinging to the cutting means and degrading the lifetime of the cutting means since the adhesive is not present on the boundary which sections the divided translucent rigid substrate laminates. In addition, it is preferable to form a groove 11 along the boundary on the cradle 10 such that the cutting means can completely cut the laminate.

As the adhesive X, it is possible to preferably use an adhesive composition as disclosed in Japanese Laid-Opened Patent Publication No. 2007-39532 which is curable at an ordinary temperature.

The adhesive X according to an embodiment is an adhesive composition which contains (A') polyfunctional(meth)acrylate, (B') monofunctional(meth)acrylate, (C') organic peroxide, (D') decomposition accelerator of the organic peroxide, and (E') polar organic solvent.

Although the adhesive X can be used as one-agent type adhesive, it is possible to use the adhesive X as two-agent type adhesive which contains first agent which contains (A') polyfunctional(meth)acrylate, (B') monofunctional(meth)acrylate, and (C') organic peroxide, and second agent which contains (A') polyfunctional(meth)acrylate, (B') monofunctional(meth)acrylate, and (D') the decomposition accelerator of organic peroxide, in which (E') the polar organic solvent is contained in any one of or both the first agent and the second agent.

However, (E') is preferably not contained in the one-agent type adhesive composition and the two-agent type adhesive composition from a viewpoint of enhancing the processing precision. This is because it is not possible to precisely perform various kinds of processing such as cutting processing and router processing and also oscillation, positional deviation, and chipping easily occurs during the processing if (E') is contained.

As (A') polyfunctional(meth)acrylate, it is possible to use (A) polyfunctional(meth)acrylate which is exemplified in the above description of the photocurable adhering agent. As (B') monofunctional(meth)acrylate, it is possible to use (B) monofunctional(meth)acrylate which is exemplified in the above description of the photocurable adhering agent. The blending ratio of (A') polyfunctional(meth)acrylate and (B') monofunctional(meth)acrylate can be set as the blending ratio of (A) polyfunctional(meth)acrylate and (B) monofunctional(meth)acrylate in the above description of the photocurable adhering agent.

In addition, the blending ratio described herein indicates the blending ratio of the entire constituent (A') and the entire constituent (B') contained in the composition, and in the case of the two-agent type adhesive composition, it is preferable that each of the first agent and the second agent contain the constituent (A') and the constituent (B') at the above mentioned blending ratio from a viewpoint of uniformity of the composition and ease of mixing the first agent and the second agent.

(C') organic peroxide includes hydroperoxides such as tertiary butyl hydroperoxide, cumene hydroperoxide, diisopropylbenzene hydroperoxide, paramenthane hydroperoxide, 2,5-dimethylhexane-2,5-dihydroperoxide, and 1,1,3,3-tetramethylbutyl hydroperoxide, keton peroxides such as methylethylketone peroxide, cyclohexanone peroxide, 3,3,5-trimethylcyclohexanone peroxide, methylcyclohexanone peroxide, methylacetoacetate peroxide, and acetylacetone peroxide, and diacyl peroxides such as acetyl peroxide, isobutyl peroxide, octanoyl peroxide, decanoyl peroxide, laurynoyl peroxide, 3,3,5-trimethylhexanoyl peroxide, succinic acid peroxide, benzoyl peroxide, 2,4-dichlorobenzoyl peroxide, and meta-toluoyl peroxide, and it is possible to use one kind or two or more kinds among them.

The additive amount of (C') organic peroxide is preferably from 0.1 parts by mass to 10 parts by mass with respect to the total of 100 parts by mass of (A') and (B'). More preferably, the additive amount is from 0.5 parts by mass to 8 parts by mass. It is possible to reliably obtain the curing property if the additive amount is equal to or more than 0.1 parts by mass, and dermal irritancy is preferably reduced without degrading the adhesive property and significantly degrading the preservation stability if the additive amount is equal to or less than 10 parts by mass.

As (D') the decomposition accelerator of organic peroxide, it is possible to use organic acid metal salt and organic metal chelate such as cobalt naphthenate, copper naphthenate, manganese naphthenate, cobalt octenoate, copper octenoate, manganese octenoate, copper acetylacetonate, titanium acetylacetonate, manganese acetylacetonate, chromium acetylacetonate, iron acetylacetonate, vanadinyl acetylacetonate, and cobalt acetylacetonate when hydroperoxides and ketone peroxides are used as organic peroxide.

In addition, as other examples of (D') the decomposition accelerator of organic peroxide, it is possible to use thiourea derivatives such as diethyl thiourea, dibutyl thiourea, ethylene thiourea, tetramethyl thiourea, mercaptobenzimidazole, benzoyl thiourea, or the like.

Furthermore, it is possible to use amines such as N,N-dimethyl-p-toluidine, N,N-diethyl-p-toluidine, N,N-di(2-hydroxyethyl)-p-toluidine, N,N-diisopropanol-p-toluidine, triethylamine, tripropylamine, ethyldiethanolamine, N,N-dimethylaniline, ethylenediamine, triethanolamine, and an aldehyde-amine condensation reaction product as the decomposition accelerator of organic peroxide when organic peroxide of diacyl peroxides such as benzoyl peroxide is used.

One kind or two or more kinds of such (D') decomposition accelerator of organic peroxide can be used.

The usage amount of (D') the decomposition accelerator of organic peroxide in the present invention is preferably from 0.1 parts by mass to 10 parts by mass with respect to the total of 100 parts by mass of (A') and (B'). More preferably, the usage amount is from 0.5 parts by mass to 8 parts by mass. It is possible to reliably obtain the curing property if the usage amount is equal to or more than 0.1 parts by mass, and the adhesive property is preferably not degraded and the preservation stability is not significantly degraded if the usage amount is equal to or less than 10 parts by mass.

The total mass of the constituents (A'), (B'), (C'), and (D') is preferably equal to or more than 90% by mass of the adhesive composition from a viewpoint of the peeling property, and can typically be equal to or more than 95% by mass and also be equal to or more than 98% by mass.

It is not particularly necessary to contain (E') the polar organic solvent in the adhesive X according to the present invention as described above, and the presence thereof is rather harmful. However, a small amount thereof may be added for a reason of enhancing the peeling property. Such polar organic solvent includes alcohol, ketone, ester, and the like.

Alcohol includes methanol, ethanol, n-propanol, isopropanol, n-butanol, isobutanol, secondary butanol, tertiary butanol, n-amyl alcohol, isoamyl alcohol, 2-ethylbutyl alcohol, and the like. Furthermore, methanol, ethanol, n-propanol, isopropanol, n-butanol, isobutanol, secondary butanol, and tertiary butanol whose boiling points are equal to or less than 120° C. are preferable among the above alcohols, and particularly, methanol, ethanol, isopropanol, and n-butanol are more preferable.

The additive amount of (E') the polar organic solvent is preferably equal to or less than 10 parts by mass, more preferably equal to or less than 5 parts by mass, further more preferably equal to or less than 1 part by mass, and most preferably equal to or less than 0.1 parts by mass with respect to the total of 100 parts by mass of (A') and (B').

It is preferable to contain a particulate matter (F') which is not dissolved in the constituents (A') to (E') of the adhesive X. In doing so, it is possible to allow the composition after the curing to maintain a predetermined thickness and to thereby enhance the processing precision. As the particulate matter (F'), any of generally used organic and inorganic particles may be used as the material. Specific examples of the organic particles include polyethylene particles, polypropylene particles, cross-linked polymethylmethacrylate particles, and cross-linked polystyrene particles, and examples of the inorganic particles include ceramic particles such as glass, silica, alumina, titanium and the like.

The particulate matter (F') preferably has a spherical shape from the viewpoint of enhancement of processing precision, namely control of the film thickness of the adhesive. Specific examples of the organic particles include cross-linked polymethylmethacrylate particles and cross-linked polystyrene particles, each of which is obtained as monodisperse particles by an emulsion polymerization method of methylmethacrylate monomer or styrene monomer, respectively, and cross-linkable monomer, and examples of the inorganic particles include spherical silica. These examples are preferable since the particles are less deformed and the film thickness of the composition after the curing due to the variations of the particle size becomes uniform, and particularly, the cross-linked polymethylmethacrylate particles and the cross-linked polystyrene particles are further more preferable from viewpoints of storing stability such as settling of the particles and reactivity of the composition.

In relation to the particle size of the particulate matter (F'), those who are skilled in the art can appropriately select the film thickness of the curing substance of the composition in accordance with the type, the shape, the size, and the like of the member, and the average particle size (D50) is preferably from 1 μm to 300 μm, particularly preferably from 5 μm to 200 μm, and further more preferably from 10 μm to 100 μm. It is possible to secure the peeling property if the average particle size is equal to or more than 1 μm, and the processing precision is not degraded if the average particle size is equal to or less than 300 μm. In addition, particle size distribution is preferably narrow to the maximum extent. The average particle size (D50) is preferably measured by a laser diffraction type particle size distribution measurement apparatus.

The usage amount of the particulate matter (F') is preferably from 0.01 parts by mass to 20 parts by mass, more preferably from 0.05 parts by mass to 10 parts by mass, and most preferably from 0.1 parts by mass to 6 parts by mass with respect to the total of 100 parts by mass of (A') and (B') from the viewpoints of the adhesive property, the processing precision, and the peeling property.

The film thickness of the composition after the curing is substantially constant if the usage amount is equal to or more than 0.01 parts by mass, and there is no concern that the initial adhesive property is degraded if the usage amount is equal to or less than 20 parts by mass.

As the adhesive composition according to the present invention, (A') to (E') are typically stirred, mixed, and used. When the one-agent type adhesive composition according to the present invention is used, it is possible to exemplify a method of mixing (A'), (B') and (D'), and (E') as necessary in advance and adding (C') when the adhesive composition is used, a method of mixing (A'), (B'), (C'), and (E') in advance and mixing (D') when the adhesive composition is used, and the like. When the two-agent type adhesive composition is used, it is possible to exemplify a method in which mixture of (A') and (B') is divided into two agents, (C') is added to one agent, (D') is added to the other agent, (E') is added to both or one of the agents as necessary, and the two agents are mixed when the adhesive composition is used, and the like. Other additives may be added at an appropriate timing.

On the other hand, it is possible to use, as the adhesive Y, the aforementioned photocurable adhering agent which is preferably used in attaching the translucent rigid substrates, specifically, the adhesive composition which contains (A) polyfunctional(meth)acrylate, (B) monofunctional(meth)acrylate, and (C) photopolymerization initiator. The constituents which can be added and the blending ratio thereof are as described above.

It is possible to add a small amount of polymerization inhibitor to the adhesive X and Y in order to enhance the storing stability. Examples of the polymerization inhibitor include methylhydroquinone, hydroquinone, 2,2-methylenebis(4-methyl-6-tertiary butylphenol), catechol, hydroquinone monomethyl ether, monotertiary butylhydroquinone, 2,5-ditertiary butylhydroquinone, p-benzoquinone, 2,5-diphenyl-p-benzoquinone, 2,5-ditertiary butyl-p-benzoquinone, picric acid, citric acid, phenothiazine, tertiary butylcatechol, 2-butyl-4-hydroxyanisole, and 2,6-ditertiary butyl-p-cresol.

The usage amount of the polymerization inhibitor is preferably from 0.001 parts by mass to 3 parts by mass, and more preferably from 0.01 parts by mass to 2 parts by mass with respect to the total of 100 parts by mass of (A) and (B) (or (A') and (B')). It is possible to secure the storing stability if the usage amount is equal to or more than 0.001 parts by mass, and it is possible to obtain a satisfactory adhesive property and non-curing does not occur if the usage amount is equal to or less than 3 parts by mass.

In addition, additives such as generally used various kinds of elastomer such as acrylic rubber, urethane rubber, and acrylonitrile-butadiene-styrene rubber, inorganic filler, solvent, extending material, strengthening agent, plasticizer, viscosity improver, dye, pigment, flame retardant, silane coupling agent, and surfactant may be used in the adhesive X and Y within a range that does not compromise the object of the present invention.

As a method for fixing the translucent rigid substrate laminate to the cradle by using the adhesive X which is curable at an ordinary temperature, there is a method in which an appropriate amount of the adhesive X is applied to the bonding plane of the laminate and/or the cradle and both the laminate and the cradle are attached and adhered, for example. In addition, in the case of the two-agent type adhesive X, it is possible to exemplify a method in which the first agent which contains (C') organic peroxide is applied to any one of the bonding planes of the laminate and the cradle, the second agent which contains (D') the decomposition accelerator of organic peroxide is applied to the other, and both the laminate and the cradle are attached and fixed to each other, in addition to the method described above.

A method for fixing the translucent rigid substrate laminate to the cradle by using the photocurable adhesive Y can be implemented by applying an appropriate amount of the adhesive Y to the bonding plane of the laminate and/or the cradle and irradiating the attached laminate and the cradle with light for causing the adhering agent which has been spread between the laminate and the cradle to cure, for example. At this time, an attention should be paid such that the photocurable adhering agent which is used in bonding the translucent rigid substrates configuring the laminate is not irradiated with the light. This is because there is a concern that internal stress is generated in the curing adhering agent due to excessive light irradiation and the translucent rigid substrate laminate peels off during the processing.

Figure 3:
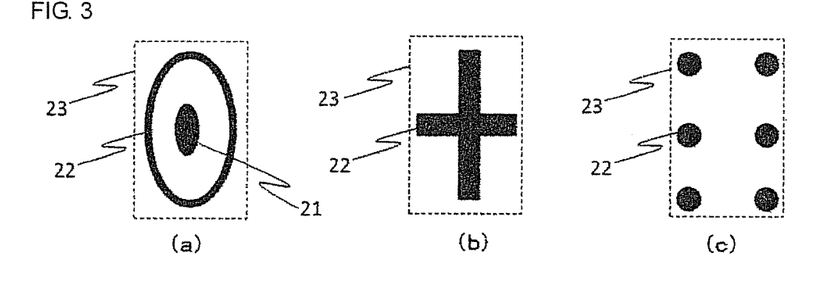
FIG. 3 shows an example of an application pattern of the adhesive for fixing the cradle.

In addition, it can be considered that the irradiation light reaches only the outer circumference of the bonding plane depending on the material and the thickness of the cradle and the size of the bonding plane of the laminate and curing does not sufficiently proceed to the inside. Thus, a method of using the adhesive Y for the outer circumferential part of the bonding plane and the adhesive X for the inside of the bonding plane can be considered. Although it is necessary to temporarily fix the laminate until the adhesive cures in order to prevent positional deviation since it takes time to cure when only the adhesive X is used, according to this method, it is possible to cause the outer circumferential part of the bonding plane to temporarily cure for about one second to thirty seconds and facilitate the temporary fixing, and therefore excellent operability can be achieved. This method can be easily used when the divided translucent rigid substrate laminates are fixed to the cradle and the outline processing is performed thereon, in particular. In such a case, an application pattern in which adhesive Y22 surrounds adhesive X21 is formed on a bonding plane 23 as shown in FIG. 3(*a*).

As another method, it is possible to exemplify a method in which the adhesive X and the adhesive Y are used in a mixed state. That is, the respective constituents of the adhesive X and the adhesive Y are mixed in advance, and mixture of the adhesive X and the adhesive Y may be obtained. Since the adhesive X is present only at a part of the bonding plane even in this case, it is possible to easily reattach the laminates and adjust positions until the adhesive Y cures by the light irradiation. Although the mixing ratio is not particularly limited, the adhesive X:the adhesive Y can typically satisfy 80:20 to 20:80 (parts by mass), and for example, the adhesive X:the adhesive Y can satisfy 66:34 (parts by mass).

<III. Cutting Processing of Translucent Rigid Substrate Laminate>

After the translucent rigid substrate laminate is fixed to the cradle, the translucent rigid substrate laminate is cut in the thickness direction, and a desired number of divided translucent rigid substrate laminates are formed.

Although the dividing method is not particularly limited, it is possible to exemplify a method of dividing the laminate into cuboid shapes with the same size by using cutting means such as a disk cutter (diamond disk or a cemented carbide disk), fixed grain type or loose grain type wire saw, a laser beam, etching (example: chemical etching using hydrofluoric acid or sulfuric acid or electrolytic etching), water jet, and a red-hot belt (nichrome wire) independently or in combination. Etching can be used for surface processing of the cutting surface after the dividing.

Figure 4:
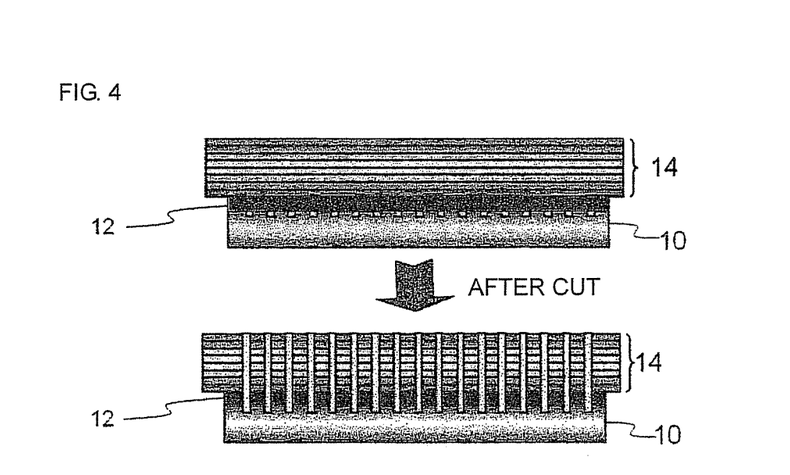
FIG. 4 is a diagram schematically showing the translucent rigid substrate laminate before the cutting processing and the translucent rigid substrate laminates after the cutting processing, which are placed on the cradle.

Since the cutting processing can be performed in a state where the translucent rigid substrate laminate is fixed to the cradle according to the present invention, it is possible to precisely perform the cutting processing. FIG. 4 is a diagram schematically showing a translucent rigid substrate laminate 14 before the cutting processing and the translucent rigid substrate laminates 14 after the cutting processing, which are placed on the cradle 10. It can be understood that the respective translucent rigid substrate laminates 14 which have been divided in the cutting processing are still fixed to the cradle 10.

<IV. Peeling of Translucent Rigid Substrate Laminates after Cutting Processing>

After the cutting processing, the divided translucent rigid substrate laminates are peeled off by applying external force without heating the translucent rigid substrate laminates at 40° C. or more. 40° C. is a temperature in consideration of a work environment in the summer, and it is not necessary to intentionally perform the heating. The temperature of the translucent rigid substrate laminates at the time of peeling is typically from 10° C. to 35° C. Although heating is schemed at the time of peeling since it essentially becomes easier to peel the adhesive X and Y which is used for bonding the translucent rigid substrate laminate to the cradle by heating the adhesive X and Y (contact with warm water typically at 30° C. to 100° C. and more typically at 60° C. to 100° C.) in the present invention, the present invention is characterized in that the translucent rigid substrate laminates are peeled off only by an external dynamic action without heating the translucent rigid substrate laminates. This is considered to be because of a common effect of a point that the adhesive does not apply such large adhering force and a point that the laminate does not easily crack even if stress is applied thereto since the laminate has a constant thickness. On the other hand, there is less concern that the adhesive which temporarily bonds the respective substrates in the translucent rigid substrate laminate loses the adhesive force and inter-layer cleavage occurs since heating is not performed.

As a method of applying the external force, it is possible to exemplify a method in which a jig made of metal such as aluminum or stainless steel or a jig 15 made of plastic such as Teflon (registered trademark) is inserted into the adhesive layer between the cradle and the translucent rigid substrate laminate, and then the translucent rigid substrate laminate is peeled off by using the principle of leverage. An example of such a jig 15 will be shown in FIG. 5.

Although the material of the cradle is not particularly limited, it is possible to exemplify aluminum and stainless steel.

<V. Fixation of Divided Translucent Rigid Substrate Laminate to Cradle>

After the peeling off from the cradle, the respective divided translucent rigid substrate laminates are fixed to the cradle for the outline processing. Fixation to the cradle can be performed in the same manner as the method described in the section of "II. Fixation of Translucent Rigid Substrate Laminate to Cradle". Although an adhesive application pattern on the bonding plane is not particularly limited, when the adhesive X is used, it is possible to use a cross-shaped pattern on the bonding plane as shown in FIG. 3(b). In addition, when the adhesive Y is used, it is possible to use a pattern in which the adhesive is made to be present in a dotted shape in the outer circumference as shown in FIG. 3(c) such that UV light emitted from the outer circumference easily reaches the adhesive.

<VI. Outline Processing of Translucent Rigid Substrate Laminates>

After the divided translucent rigid substrate laminates are fixed to the cradle, desired outline processing is performed thereon. Since it is possible to integrally perform the processing on each of the divided translucent rigid substrate laminates so as to make a targeted shape of a plate shaped product from each of the laminate in this process, there is an advantage that it is possible to significantly increase a production speed of the plate shaped product. Although the outline processing may be performed by arbitrary known means, it is possible to exemplify grinding by a rotating grinding stone, pinching by an ultrasonic oscillation drill, end surface processing by a rotating brush, punching by etching, end surface processing by etching, outline processing by etching, flame processing by using a burner, and the like. The processing methods can be used independently or in combination. Etching can be also used in the surface processing after the shape processing.

Since it is possible to perform the outline processing in the state where the translucent rigid substrate laminates are fixed to the cradle in the present invention, it is possible to precisely perform the outline processing.

<VII. Peeling of Translucent Rigid Substrate Laminates after Outline Processing>

After the outline processing, the translucent rigid substrate laminates are peeled off from the cradle by applying external force without heating the translucent rigid substrate laminates at 40° C. or more in the same manner as in, "IV. Peeling of Translucent Rigid Substrate Laminates After Cutting Processing".

<VIII. Formation of Plate Shaped Product>

The translucent rigid substrate which are attached to each other are peeled off by heating the translucent rigid substrate laminates after the outline processing, and a plurality of plate shaped products are formed. Although a heating method is not particularly limited, a method in which the translucent rigid substrate laminates after the shape processing are dipped into hot water is preferable since the adhering agent is softened into a film state and satisfactorily separated into the respective plate shaped products. Although a preferable temperature of the hot water differs depending on the employed adhering agent, the temperature is generally from about 60° C. to about 100° C.

Although the above description of the embodiments of the present invention with reference to the drawings was given, the present invention is not limited to the above embodiments, and various variations can be made.

EXAMPLES

Hereinafter, the following examples will be provided in order to promote understanding of the present invention and the advantages thereof.

Example 1

1. Preparing of Photocurable Adhering Agent (Adhering Agent (I))

Photocurable adhering agent was prepared by mixing the following constituents (A) to (D).

As (A) polyfunctional(meth)acrylate, 20 parts by mass of "UV-3000B" available from Nippon Synthetic Chemical Industry Co., Ltd. (urethaneacrylate which will be abbreviated as "UV-3000B" below, weight average molecular weight: 18000, a polyol compound is polyester polyol, an organic polyisocyanate compound is isophorone diisocyanate, hydroxyl(meth)acrylate is 2-hydroxyethylacrylate) and 15 parts by mass of dicyclopentanyl diacrylate ("KAYARAD R-684" available from Nippon Kayaku Co., Ltd., which will be abbreviated as "R-684" below), as (B) monofunctional(meth)acrylate, 40 parts by mass of 2-(1,2-cyclohexacarboxylmide)ethylacrylate ("Aronix M-140" available from Toagosei Co., Ltd., which will be abbreviated as "M-140" below") and 25 parts by mass of 2-mol phenolethylene oxide modified acrylate ("Aronix M-101A" available from Toagosei Co., Ltd.), as (C) the photopolymerization initiator, 5 parts by mass of BDK: benzyl dimethyl ketal ("IRGACURE651" available from BASF Japan Ltd.), and as (D) the particulate matter which is not dissolved in (A) to (C), 1 part by mass of spherical cross-linked polystyrene particles with an average particle size (D50) of 100 µm ("GS-100S" available from GANZ Chemical Co., Ltd.).

2. Manufacturing of Plate Glass Laminate

Ten pieces of plate glass (530 mm wide×420 mm long×0.7 mm thick) were prepared as translucent rigid substrates and attached to each other via the photocurable adhering agent, and plate glass laminate was manufactured. Specifically, after 40 g of the photocurable adhering agent was applied to first plate glass, second plate glass was attached to the first plate glass, the surface of the second plate glass was irradiated with UV, and the photocurable adhering agent was made to cure. The UV irradiation amount was set to 3000 mJ/cm$^2$ (measured by a cumulative illuminometer by a light receiver of 365 nm), and the UV irradiation time was set to 40 seconds. By repeating the procedure, the plate glass laminate with a thickness of 8 mm, which was configured by 10 pieces of plate glass, was manufactured.

3. Preparing of Adhesive for Fixing Cradle (Adhering Agent (II))

As (A') polyfunctional(meth)acrylate, 20 parts by mass of "UV-3000B" available from Nippon Synthetic Chemical Industry Co., Ltd (urethaneacrlate which will be abbreviated as "UV-3000B" below) and 30 parts by mass of tripropylene glycol diacrylate (NK ester APG-200 available from Shinnakamura Chemical Co., Ltd., which will be abbreviated as "APG-200" below"), as (B') monofunctional(meth)acrylate, 40 parts by mass of 2-(1,2-cyclohexacarboxylmide)ethylacrylate (Aronix M-140 available from Toagosei Co., Ltd., which will be abbreviated as "M-140" below) and 10 parts by mass of 2-mol phenolethylene oxide modified acrylate (Aronix M-101A available from Toagosei Co., Ltd., which will be abbreviated as "M-101A" below"), as (C') organic peroxide, 3 parts by mass of cumene hydroperoxide (Percumyl H-80 available from NOF Corporation, which will be abbreviated as "CHP" below), as the particulate matter (F'), 0.6 parts by mass of cross-linked polymethylmethacrylate particles with an average particle size of 35 µm (Art Pearl GR-200 available from Negami Chemical Industry Co., Ltd., spherical shape, which will be abbreviated as "GR-200" below), and as the polymerization inhibitor, 0.1 parts by mass of 2,2-methylene-bis(4-methyl-6-tertiary butylphenol) (which will be abbreviated as "MDP" below) were mixed, and a composition was prepared. Three parts by mass of cobalt octenoate (Octry C012 available from Shinto Fine Co., Ltd., which will be abbreviated as "Oct-CO" below) was added as (D') the decomposition accelerator of organic peroxide to the prepared composition, and an adhesive composition was prepared. The adhesive composition corresponds to the adhesive X.

4. Fixation of Plate Glass Laminate to Cradle

After a cradle (material: aluminum) was prepared and 20 g of the adhesive was applied to the bonding plane of the cradle, the plate glass laminate was attached to the bonding plane carefully so as not to mix air bubbles into the bonding plane. Thereafter, the plate glass laminate was fixed to the cradle with a groove as shown in FIG. 2 by causing the adhesive to cure by leaving the substance at a room temperature for thirty minutes. In addition, the adhesive was not adhered to the groove part.

5. Cutting Processing of Plate Glass Laminate

The plate glass laminate which was fixed to the cradle was cut by a disk cutter along the groove of the cradle, and forty plate glass laminates which were divided into a size of 100 mm wide×50 mm long×8 mm thick were obtained.

6. Peeling of Plate Glass Laminates (First Peeling Test)

Figure 5:
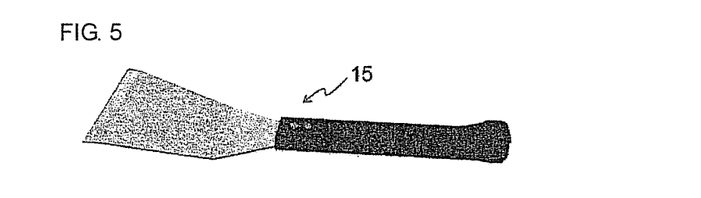
FIG. 5 is a diagram schematically showing a jig which is used when the translucent rigid substrate laminate is peeled off from the cradle.

Thereafter, the jig 15 (a pry) which had a plate-shaped inserting portion and was made of aluminum as shown in FIG. 5 was inserted into the adhesive layer between the cradle and the plate glass laminates, and the respective divided plate glass laminates were peeled by using the principle of leverage without heating the plate glass laminates. The temperature of the plate glass laminates at this time was 20° C.

7. Fixation of Divided Plate Glass Laminates to Cradle

After another flat cradle (material: aluminum) was prepared and 5 g of the aforementioned adhesive for fixing the cradle was applied to the bonding plane of the cradle, one of the divided plate glass laminates was attached carefully so as not to mix air bubbles into the bonding plane. Thereafter, the divided plate glass laminate was fixed to the cradle by causing the adhesive for fixing the cradle to cure by leaving the substance at a room temperature for thirty minutes.

8. Outline Processing of Divided Plate Glass Laminate

Figure 6:
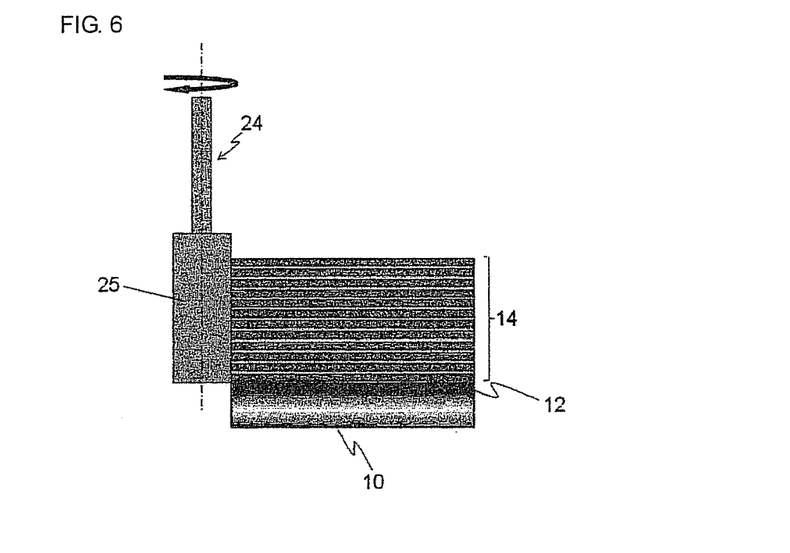
FIG. 6 is a diagram schematically showing a method for the outline processing performed in examples.

Outline processing was performed on the divided plate glass laminate which was fixed on the cradle by a method of grinding the outer circumference of the plate glass laminate by about 1 mm by using a router 24 in which a diamond is electrodeposited in a grinding stone 25 as shown in FIG. 6.

9. Peeling of Divided Plate Glass Laminate (Secondary Peeling Test)

Thereafter, the jig 15 (a pry) which had a plate-shaped inserting portion and was made of aluminum as shown in FIG. 5 was inserted into the adhesive layer between the cradle and the plate glass laminate, and the plate glass laminate after the outline processing was peeled by using the principle of leverage without heating the plate glass laminate. The temperature of the plate glass laminate at this time was 20° C.

Example 2

1. Manufacturing of Plate Glass Laminate

Ten pieces of plate glass (20 mm wide×20 mm long×0.7 mm thick) were prepared as translucent rigid substrates and attached to each other via the photocurable adhering agent for laminating the plate glass which was used in Example 1, and plate glass laminate was manufactured. Specifically, after 0.5 g of the photocurable adhering agent was applied to first plate glass, second plate glass was attached to the first plate glass, the surface of the second plate glass was irradiated with UV, and the photocurable adhering agent was made to cure. The UV irradiation amount was set to 3000 mJ/cm$^2$ (measured by a cumulative illuminometer by a light receiver of 365 nm), and the UV irradiation time was set to 40 seconds. By repeating the procedure, the plate glass laminate with a thickness of 8 mm, which was configured of 10 pieces of plate glass, was manufactured.

2. Preparing of Adhesive for Fixing Cradle (Adhering Agent (III))

As (A) polyfunctional(meth)acrylate, 15 parts by mass of "UV-3000B" available from Nippon Synthetic Chemical Industry Co., Ltd (urethaneacrylate which will be abbreviated as "UV-3000B" below) and 15 parts by mass of dicyclopentanyl diacrylate ("KAYARAD R-684" available from Nippon Kayaku Co., Ltd., which will be abbreviated as "R-684" below), as (B) monofunctional(meth)acrylate, 45 parts by mass of 2-(1,2-cyclohexacarboxylmide)ethylacrylate (Aronix M-140 available from Toagosei Co., Ltd., which will be abbreviated as "M-140" below) and 25 parts by mass of 2-mol phenolethylene oxide modified acrylate (Aronix M-101A available from Toagosei Co., Ltd., which will be abbreviated as "M-101A" below"), as (C) the photopolymerization initiator, 10 parts by mass of benzyl dimethyl ketal ("IRGACURE651" available from BASF Japan Ltd., which will be abbreviated as "BDK" below), as (D) the particulate matter, 0.1 parts by mass of spherical cross-linked polystyrene particles with an average particle size of 100 μm ("GS-100S" available from GANZ Chemical Co., Ltd.), and as polymerization inhibitor, 0.1 parts by mass of 2,2-methylene-bis(4-methyl-6-tertiary butylphenol) ("Sumilizer MDP-S" available from Sumitomo Chemical Co., Ltd., which will be abbreviated as "MDP" below) were mixed, and a UV adhesive composition was prepared. The adhesive composition corresponds to the adhesive Y.

3. Fixation of Plate Glass Laminate to Cradle

After a cradle (material: aluminum) was prepared and 0.5 g of the adhesive for fixing the cradle was applied to the bonding plane of the cradle, the plate glass laminate was attached to the bonding plane carefully so as not to mix air bubbles into the bonding plane. Then, the plate glass laminate was fixed to the cradle by irradiating the adhesive layer for fixing the cradle from the circumference of the laminate with UV by a spot irradiator carefully so as not to directly irradiate the photocurable adhering agent, which attached the glass plates configuring the laminate, with UV. As for the UV irradiation conditions, irradiation with a UV irradiation amount of 1600 mJ/cm$^2$ (measured by a cumulative illuminometer by a light receiver of 365 nm) was performed once for each side of the adhesive layer for fixing the cradle, and the irradiation was performed on four sides. UV irradiation time for the respective irradiation was 6 seconds.

4. Cutting Processing of Plate Glass Laminate

The plate glass laminate which was fixed to the cradle was cut by a disk cutter in the thickness direction along the groove of the cradle, and two plate glass laminates which were divided into a size of 20 mm wide×10 mm long×8 mm thick were obtained.

5. Peeling of Plate Glass Laminates

Thereafter, the jig 15 (a pry) which had a plate-shaped inserting portion and was made of aluminum as shown in FIG. 5 was inserted into the adhesive layer between the cradle and the plate glass laminates, and the respective divided plate glass laminates were peeled by using the principle of leverage without heating the plate glass laminates. The temperature of the plate glass laminates at this time was 20° C.

Example 3

The manufacturing of the laminate, the fixation to the cradle, the cutting processing, and the peeling from the cradle were performed in the same manner as in Example 2 except that mixture obtained by mixing the adhesive composition for fixing the cradle used in Example 1 (adhering agent (II)) and Example 2 (adhering agent (III)) at a ratio of 1:1 (mass ratio) was used as the adhesive for fixing the cradle and the curing of the adhesive was performed by a method of leaving the substance at a room temperature for thirty minutes after the UV irradiation. The UV irradiation for causing the adhesive for fixing the cradle to cure was performed by irradiating the adhesive layer for fixing the cradle with UV by a spot irradiator from the circumference of the laminate carefully so as not to directly irradiate the photocurable adhering agent, which attached the glass plates configuring the laminate, with UV, and irradiation with a UV irradiation amount of 1600 mJ/cm$^2$ (measured by a cumulative illuminometer by a light receiver of 365 nm) was performed once for each side of the adhesive layer for fixing the cradle, and the irradiation was performed on four sides. UV irradiation time for the respective irradiation was 6 seconds.

Example 4

The adhesive composition in Example 1 (adhering agent (II)) and the adhesive composition in Example 2 (adhering agent (III)) were prepared as the adhesive for fixing the cradle, and the adhesive in Example 2 (adhering agent (III)) (0.2 g) was applied to the outer circumferential part of the bonding plane so as to surround the adhesive (adhering agent (II)) (0.2 g) in Example 1 which was applied to the inside of the bonding plane. Then, the manufacturing of the laminate, the fixation to the cradle, and the peeling from the cradle were performed in the same manner as in Example 2 except that the curing of the adhesive was performed by a method of leaving the substance at a room temperature for thirty minutes after the UV irradiation. The UV irradiation for causing the adhesive for fixing the cradle to cure was performed by irradiating the adhesive layer for fixing the cradle with UV by a spot irradiator from the circumference of the laminate carefully so as not to directly irradiate the photocurable adhering agent, which attached the glass plates configuring the laminate, with UV, and irradiation with a UV irradiation amount of 1600 mJ/cm$^2$ (measured by a cumulative illuminometer by a light receiver of 365 nm) was performed once for each side of the adhesive layer for fixing the cradle, and the irradiation was performed on four sides. UV irradiation time for the respective irradiation was 6 seconds.

Example 5

Comparison

The manufacturing of the laminate, the fixation to the cradle, the cutting processing, and the peeling from the cradle were performed in the same manner as in Example 2 except that "Adfix A" which was hot melt type adhesive available from Nikka Seiko Co., Ltd was used as the adhesive for fixing the cradle and the curing of the adhesive and the peeling from the cradle were performed by heating. The heating for the curing and the peeling was performed by heating the cradle at 100° C. for thirty minutes by a hot plate.

Example 6

Comparison

The manufacturing of the laminate, the fixation to the cradle, the cutting processing, and the peeling from the cradle were performed in the same manner as in Example 2 except that "HF8600" which was a two-agent ordinary temperature curing type available from Loctite Corporation was used as the adhesive for fixing the cradle and the curing of the adhesive was performed by a method of leaving the substance at room temperature for thirty minutes. The adhesive was different from the ordinary temperature curing type adhesive used in the present invention in that the total content of A', B', C', and D' was less than 90% by mass of the composition.

Example 7

Comparison

The manufacturing of the laminate, the fixation to the cradle, the cutting processing, and the peeling from the cradle were performed in the same manner as in Example 2 except that Scotch-Weld EPX "DP-105 Clear" which was a two-agent ordinary temperature curing type available from Sumitomo 3M Limited was used as the adhesive for fixing the cradle and the curing of the adhesive was performed by a method of leaving the substance at a room temperature for thirty minutes. The adhesive was different from the ordinary temperature curing type adhesive used in the present invention in that the adhesive was epoxy type adhesive and the total content of A', B', C', and D' was less than 90% by mass of the composition.

Example 8

Comparison

The manufacturing of the laminate, the fixation to the cradle, the cutting processing, and the peeling from the cradle were performed in the same manner as in Example 2 except that World Rock "8791L3" which was an ultraviolet curing type available from Kyoritsu Chemical & Co., Ltd. was used as the adhesive for fixing the cradle. The adhesive was different from the photocurable adhesive used in the present invention in that the adhesive is epoxy type adhesive and inorganic filler is blended therein.

Example 9

This example was implemented in the same manner as Example 2 except that the adhesive (adhering agent (IV)) for fixing the cradle was used instead of the adhesive composition for fixing the cradle which was used in Example 2 (adhering agent (III)).
1. Preparing of Adhesive for Fixing Cradle (Adhering agent (IV))

As (A) polyfunctional(meth)acrylate, 20 parts by mass of "UV-3000B" available from Nippon Synthetic Chemical Industry Co., Ltd. (urethaneacrylate which will be abbreviated as "UV-3000B" below, weight average molecular weight: 18000) and 25 parts by mass of dicyclopentanyl diacrylate ("KAYARAD R-684" available from Nippon Kayaku Co., Ltd., which will be abbreviated as "R-684" below), as (B) monofunctional(meth)acrylate, 35 parts by mass of 2-hydroxy-3-phenoxypropylacrylate ("Aronix M-5700" available from Toagosei Co., Ltd., which will be abbreviated as "M-5700") and 20 parts by mass of 2-mol phenolethylene oxide modified acrylate ("Aronix M-101A" available from Toagosei Co., Ltd.), as (C) the photopolymerization initiator, 10 parts by mass of benzyl dimethyl ketal ("IRGACURE651" available from BASF Japan Ltd., which will be abbreviated as "BDK" below), and as (D) the particulate matter, 1 part by mass of spherical cross-linked polystyrene particles with an average particle size of 100 μm ("GS-100S" available from GANZ Chemical Co., Ltd.), and as (E) the polymerization inhibitor, 0.1 parts by mass of 2,2-methylene-bis(4-methyl-6-tertiary butylphenol) ("Sumilizer MDP-S" available from Sumitomo Chemical Co., Ltd., which will be abbreviated as "MDP" below).

Example 10

This example was implemented in the same manner as Example 3 except that the preparing of the adhesive for fixing the cradle (adhering agent (IV)) was employed instead of the adhesive composition for fixing the cradle which was used in Example 2 (adhering agent (III)).

Example 11

This example was implemented in the same manner as Example 4 except that the preparing of the adhesive for fixing the cradle (adhering agent (IV)) was employed instead of the adhesive composition for fixing the cradle which was used in Example 2 (adhering agent (III)).

<Results> Experimental results will be shown in Table 1. In Examples 1 to 4 and 9 to 11, it was possible to completely peel the laminates without leaving glue on the glass side. In addition, less chipping was observed in the glass which was subjected to the cutting processing in Example 4 in comparison between Examples 3 and 4. In Example 5 (comparison), adhesive strength between the plate glass pieces which configured the laminate was degraded due to the heat applied during each of the bonding and the peeling, and interlayer cleavage was easily performed by hands. In Examples 6 to 8 (comparison), the adhesive force was excessively high, and a part of the plate glass cracked during the peeling. In addition, less chipping was observed in the glass which was subjected to the cutting processing in Example 11 in comparison between Examples 10 and 11.

TABLE 1

| No. | Peeling from cradle during cutting processing or outline processing | Peeling state |
| --- | --- | --- |
| Example 1 (first peeling test) | None (cutting processing) | It was possible to completely peel the laminate without leaving glue on the glass side. |
| Example 1 (secondary peeling test) | None (outline processing) | It was possible to completely peel the laminate without leaving glue on the glass side. |
| Example 2 | None (cutting processing) | It was possible to completely peel the laminate without leaving glue on the glass side. |
| Example 3 | None (cutting processing) | It was possible to completely peel the laminate without leaving glue on the glass side. |
| Example 4 | None (cutting processing) | It was possible to completely peel the laminate without leaving glue on the glass side. |
| Example 5 (Comparison) | None (cutting processing) | Although the laminate was peeled, the laminate was in a state where it was possible to peel the plate glass pieces configuring the laminate by hands. |
| Example 6 (Comparison) | None (cutting processing) | The plate glass cracked during the peeling, and glue remained on the glass side. |

TABLE 1-continued

| No. | Peeling from cradle during cutting processing or outline processing | Peeling state |
|---|---|---|
| Example 7 (Comparison) | None (cutting processing) | The plate glass cracked during the peeling, and glue remained on the glass side. |
| Example 8 (Comparison) | None (cutting processing) | The plate glass cracked during the peeling, and glue remained on the glass side. |
| Example 9 | None (cutting processing) | It was possible to completely peel the laminate without leaving glue on the glass side. |
| Example 10 | None (cutting processing) | It was possible to completely peel the laminate without leaving glue on the glass side. |
| Example 11 | None (cutting processing) | It was possible to completely peel the laminate without leaving glue on the glass side. |

Example 12

The adhesive for fixing the cradle which includes the same constituents as those in the photocurable adhering agent in Example 1 was used except that 5 parts by mass of methanol was added. The manufacturing of the laminate, the fixation to the cradle, the cutting processing, and the peeling from the cradle were performed in the same manner as in Example 1 except the above point. In such a case, although it was possible to completely peel the laminate without leaving glue on the glass side, a part of the divided plate glass laminates dropped off from the cradle during the cutting processing.

REFERENCE SIGNS LIST

10 cradle
11 groove
12 adhesive
14 translucent rigid substrate laminate
15 jig
21 adhesive X
22 adhesive Y
23 bonding plane
24 router
25 grinding stone Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for processing a translucent rigid substrate laminate comprising the steps of:
   preparing a translucent rigid substrate laminate by adhering two or more translucent rigid substrates with photocurable adhering agent;
   fixing the laminate to a cradle with adhesive X, adhesive Y, or combination thereof described below;
   <adhesive X>
   an adhesive composition, which contains (A') polyfunctional (meth)acrylate, (B') monofunctional (meth)acrylate, (C') organic peroxide, and (D') decomposition accelerator of the organic peroxide, in which total mass of the constituents (A'), (B'), (C'), and (D') occupies 90% by mass or more of the composition
   <adhesive Y>
   an adhesive composition, which contains (A) polyfunctional (meth)acrylate, (B) monofunctional (meth)acrylate, and (C) photopolymerization initiator, in which total mass of the constituents (A), (B), and (C) occupies 90% by mass or more of the composition
   performing processing A for cutting the laminate, which is fixed to the cradle, in a thickness direction and forming a desired number of divided translucent rigid substrate laminates, or performing desired outline processing B on the laminate which is fixed to the cradle; and
   peeling the processed translucent rigid substrate laminate from the cradle by applying external force without heating the translucent rigid substrate laminate at 40° C. or more,
   wherein the processing B is performed, and the adhesive X and the adhesive Y are applied to the cradle and/or the bonding planes of the laminates in an application pattern in which the adhesive Y surrounds the adhesive X.

2. The method for processing a translucent rigid substrate laminate according to claim 1,
   wherein the processing A is performed, and the adhesive X, the adhesive Y, or the combination thereof is applied to the cradle and/or bonding planes of the translucent rigid substrate laminates in an application pattern in which the respective divided laminates are able to maintain a fixed state to the cradle even after the processing.

3. The method for processing a translucent rigid substrate laminate according to claim 2,
   wherein the adhesive X, the adhesive Y, or the combination thereof is a mixture of the adhesive X and the adhesive Y.

4. The method for processing a translucent rigid substrate laminate according to claim 2,
   wherein at least the adhesive X is used, and the adhesive X does not contain polar organic solvent.

5. The method for processing a translucent rigid substrate laminate according to claim 2,
   wherein the step of peeling the processed translucent rigid substrate laminate, which has been divided or subjected to the outline processing, from the cradle by applying external force without heating the translucent rigid substrate laminate at 40° C. or more is a step of peeling the translucent rigid substrate laminate by inserting a jig into an adhesive layer between the cradle and the translucent rigid substrate laminate and using the principle of leverage.

6. The method for processing a translucent rigid substrate laminate according to claim 1,
   wherein the adhesive X, the adhesive Y, or the combination thereof is a mixture of the adhesive X and the adhesive Y.

7. The method for processing a translucent rigid substrate laminate according to claim 1,
   wherein at least the adhesive X is used, and the adhesive X does not contain polar organic solvent.

8. The method for processing a translucent rigid substrate laminate according to claim 1,
   wherein the step of peeling the processed translucent rigid substrate laminate, which has been divided or subjected to the outline processing, from the cradle by applying external force without heating the translucent rigid substrate laminate at 40° C. or more is a step of peeling the translucent rigid substrate laminate by inserting a jig into an adhesive layer between the cradle and the translucent rigid substrate laminate and using the principle of leverage.

9. The method for processing a translucent rigid substrate laminate according to claim 1,
wherein the translucent rigid substrate is plate glass.

10. A method for manufacturing a plate shaped product comprising the steps of:
peeling translucent rigid substrates, which are attached to each other, by heating a translucent rigid substrate laminate which has been subjected to the method for processing a translucent rigid substrate laminate according to claim 1 and forming a plurality of plate shaped products.

11. A method for processing a translucent rigid substrate laminate comprising the steps of:
preparing a translucent rigid substrate laminate by adhering two or more translucent rigid substrates with photocurable adhering agent;
fixing the laminate to a cradle with adhesive X, adhesive Y, or combination thereof described below;
<adhesive X>
an adhesive composition, which contains (A') polyfunctional (meth)acrylate, (B') monofunctional (meth)acrylate, (C') organic peroxide, and (D') decomposition accelerator of the organic peroxide, in which total mass of the constituents (A'), (B'), (C'), and (D') occupies 90% by mass or more of the composition
<adhesive Y>
an adhesive composition, which contains (A) polyfunctional (meth)acrylate, (B) monofunctional (meth)acrylate, and (C) photopolymerization initiator, in which total mass of the constituents (A), (B), and (C) occupies 90% by mass or more of the composition
performing processing A for dividing the laminate, which is fixed to the cradle, in a thickness direction and forming a desired number of divided translucent rigid substrate laminates;
peeling the divided translucent rigid substrate laminates from the cradle by applying external force without heating the translucent rigid substrate laminates at 40° C. or more;
fixing the respective peeled translucent rigid substrate laminates to the cradle with the adhesive X, the adhesive Y, or the combination thereof;
performing desired outline processing B on the laminates fixed to the cradle; and
peeling the translucent rigid substrate laminates, which has been subjected to the outline processing, from the cradle by applying external force without heating the translucent rigid substrate laminate at 40° C. or more,
wherein the processing B is performed, and the adhesive X and the adhesive Y are applied to the cradle and/or the bonding planes of the laminates in an application pattern in which the adhesive Y surrounds the adhesive X.

12. The method for processing a translucent rigid substrate laminate according to claim 11,
wherein the processing A is performed, and the adhesive X, the adhesive Y, or the combination thereof is applied to the cradle and/or bonding planes of the translucent rigid substrate laminates in an application pattern in which the respective divided laminates are able to maintain a fixed state to the cradle even after the processing.

13. The method for processing a translucent rigid substrate laminate according to claim 11,
wherein the adhesive X, the adhesive Y, or the combination thereof is mixture of the adhesive X and the adhesive Y.

14. The method for processing a translucent rigid substrate laminate according to claim 11,
wherein at least the adhesive X is used, and the adhesive X does not contain polar organic solvent.

15. The method for processing a translucent rigid substrate laminate according to claim 11,
wherein the step of peeling the processed translucent rigid substrate laminate, which has been divided or subjected to the outline processing, from the cradle by applying external force without heating the translucent rigid substrate laminate at 40° C. or more is a step of peeling the translucent rigid substrate laminate by inserting a jig into an adhesive layer between the cradle and the translucent rigid substrate laminate and using the principle of leverage.

16. The method for processing a translucent rigid substrate laminate according to claim 11,
wherein the translucent rigid substrate is plate glass.

17. A method for manufacturing a plate shaped product comprising the steps of:
peeling translucent rigid substrates, which are attached to each other, by heating a translucent rigid substrate laminate which has been subjected to the method for processing a translucent rigid substrate laminate according to claim 11 and forming a plurality of plate shaped products.

* * * * *